C. D. PLATT.
MEANS FOR ATTACHING INSULATING LININGS.
APPLICATION FILED SEPT. 26, 1908.

937,463.

Patented Oct. 19, 1909.

Witnesses:
H. A. Lamb.
S. W. Atherton.

Inventor
Clarence D. Platt
By Attorney
A. M. Wooster

UNITED STATES PATENT OFFICE.

CLARENCE D. PLATT, OF BRIDGEPORT, CONNECTICUT.

MEANS FOR ATTACHING INSULATING-LININGS.

937,463.

Specification of Letters Patent.

Patented Oct. 19, 1909.

Application filed September 26, 1908. Serial No. 454,903.

*To all whom it may concern:*

Be it known that I, CLARENCE D. PLATT, a citizen of the United States, residing at Bridgeport, county of Fairfield, State of Connecticut, have invented a new and useful Means for Attaching Insulating-Linings, of which the following is a specification.

This invention relates to incandescent lamp sockets and the linings thereof, the object being to provide a simple and inexpensive structure for removably securing the insulating linings in the shells.

It is of course essential that the shell and lining shall be strong enough to stand all handling or treatment without becoming separated, in use. But as it is frequently desirable to remove the linings from a stock of shells so that the shells can be refinished to change the style thereof, the means which holds the shells and linings together should be such as to permit them to be readily separated, because in the refinishing of the metal shells it is usually necessary to put them in an acid bath, and this would destroy or injure the linings. Sometimes the shells need to be changed as to their finishing so as to be what is known as "brush brass" or "antique brass" or "oxidized copper" or other styles of finish.

In carrying out my invention I provide the shell with a removable lining having such relative diameters as to leave a slight space between them, sufficient to allow for the swelling of the lining which usually occurs in damp weather, and to provide the shell and lining with interlocking shoulders to hold the members assembled.

Figure 1:
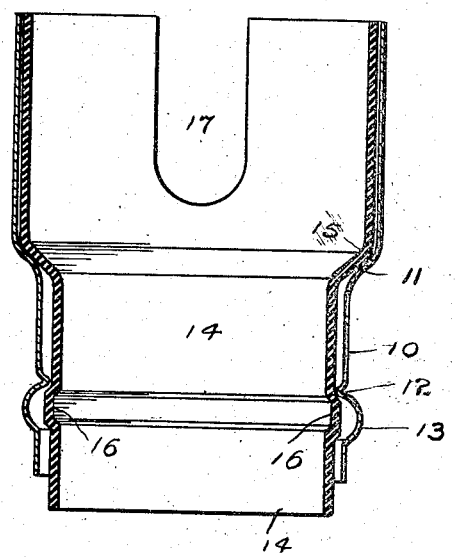
Figure 2:
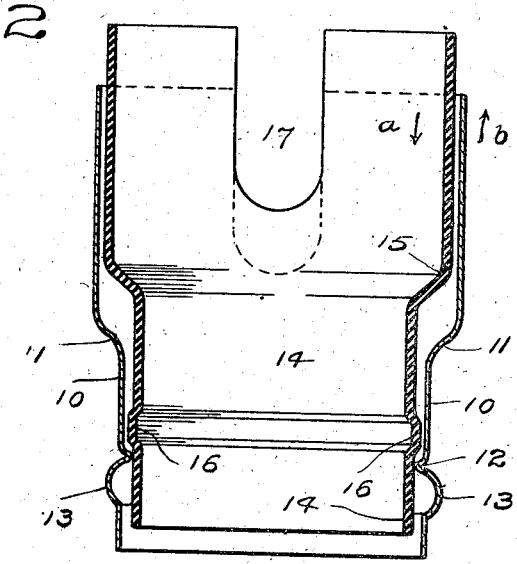

In the accompanying drawing forming a part of this specification, Figure 1 represents a longitudinal section of an electric socket shell with an insulating lining therein in its final position; Fig. 2 is a similar view but showing the parts in the act of being assembled.

10 denotes the shell of an incandescent lamp socket which is shown as provided with the usual shoulder 11, it being customary to make the ends of socket shells of different diameters, and 13 denotes a circumferential rib near the smaller end of the shell, this rib being of the usual form employed to coact with the attaching devices of shades.

14 denotes the lining which may be made of any suitable insulating material and is shown as provided with a shoulder 15 corresponding with the shoulder 11 of the socket shell. Both the shell and the lining are shown as provided with slots 17 which are placed in alinement in assembling and receive the shaft of the switch-key (not shown). The lining is provided with a circumferential rib 16 which is adapted to interlock with the rib 13 of the shell. These two ribs interlock when the members are relatively moved in the directions of the arrows $a$ and $b$ in Fig. 2, to the position shown in Fig. 1, in which latter position the under-surface of the bead 12 coacts with the upper surface of the rib 16, said surfaces forming shoulders which interlock so as to retain the lining securely in the shell no matter in what position the shell may be placed. The internal surface of the shoulder 11 and the external surface of the shoulder 15 simply serve to limit the relative movements of the two members when being assembled. They are in no sense interlocking shoulders, although they do, to some extent, coact with the contacting surfaces of the bead 12 and rib 16 to prevent any longitudinal movement of one member relatively to the other when the two are assembled, although there is a clear space between all other portions of the two members.

It is to be understood that the drawings show the device considerably enlarged, and that the relative diameters of the bead 12 and rib 16, or rather the shoulders presented thereby, are somewhat exaggerated in order that the drawings may illustrate the interlocking action. In practice the relative diameters are such that by the employment of not too great a force, the parts can be shifted from the position shown in Fig. 2 to that shown in Fig. 1. And still they may be separated by relative movements in the directions opposite to that represented by the arrows $a$ and $b$, whenever it is desirable to get the linings out for the purpose of refinishing, or altering the finish of, the metal shells.

The engagement or interlocking of the shoulders provided by the contacting surfaces of the bead 12 and the rib 16 is strong enough to hold the parts assembled under all conditions of handling or treatment, and yet the space which exists between the lining and the shell not only permits the lining to swell in damp weather, but also renders it easily practicable to separate the linings from the shells in the manner and for the purpose described, there being no such frictional engagement as would prevent such separation.

It is to be understood that the bead 12 and the rib 16 might be located anywhere along the length of the shell and lining, but the location is preferably, for purposes of convenience of manufacture, close to the usual rib 13 as shown.

Having now described my invention, I claim:—

A socket shell and lining therefor, the relative diameters being such as to leave a slight space between them, the shell having an inwardly projecting annular bead, the lining having an outwardly projecting circumferential rib to interlock with said bead, and the shell and lining having other coacting shoulders to limit the relative positions when the shell and lining are assembled.

In testimony whereof I affix my signature, in presence of two witnesses.

CLARENCE D. PLATT.

Witnesses:
A. M. WOOSTER,
S. W. ATHERTON.